United States Patent

[11] 3,622,736

[72] Inventors: Pavel Blaskovitz, Bratislava; Jiri Borda, Cesky Tesin, both of Czechoslovakia
[21] Appl. No.: 12,966
[22] Filed: Feb. 20, 1970
[45] Patented: Nov. 23, 1971
[73] Assignee: Vyskumny ustav Zvaracsky Bratislava, Czechoslovakia
[32] Priority: Feb. 21, 1969
[33] Czechoslovakia
[31] 1232/69

[54] ARRANGEMENT FOR DEPOSITING A METALLIC LAYER USING THE ELECTROSLAG METHOD ON THE CIRCUMFERENCE OF HORIZONTAL CYLINDRICAL BODIES
2 Claims, 5 Drawing Figs.

[52] U.S. Cl. ................................ 219/73, 219/126
[51] Int. Cl. ............................. B23k 9/18, B23k 25/00, B23k 9/12
[50] Field of Search .................. 219/73, 124, 125, 126

[56] References Cited
UNITED STATES PATENTS
3,211,887  10/1965  Cotterman .................. 219/126

Primary Examiner—J. V. Truhe
Assistant Examiner—L. Rouse
Attorney—Arthur O. Klein ABSTRACT: An arrangement for depositing a metallic layer by the electroslag method on the circumference of cylindrical bodies disposed with their longitudinal axis horizontal, particularly of calibrating rolls of rolling machines having a V-shaped profile; in order to prevent cracks of the deposited layer, stable welding electrodes are provided in the apex part of the profile, and mobile electrodes performing an oscillating movement within the welding gap are arranged at both sides of the stable electrode.

INVENTORS:
Pavel Blaskowits
BY: Jiri Borda
Arthur O. Klein
ATTORNEY

PATENTED NOV 23 1971 3,622,736
SHEET 2 OF 2
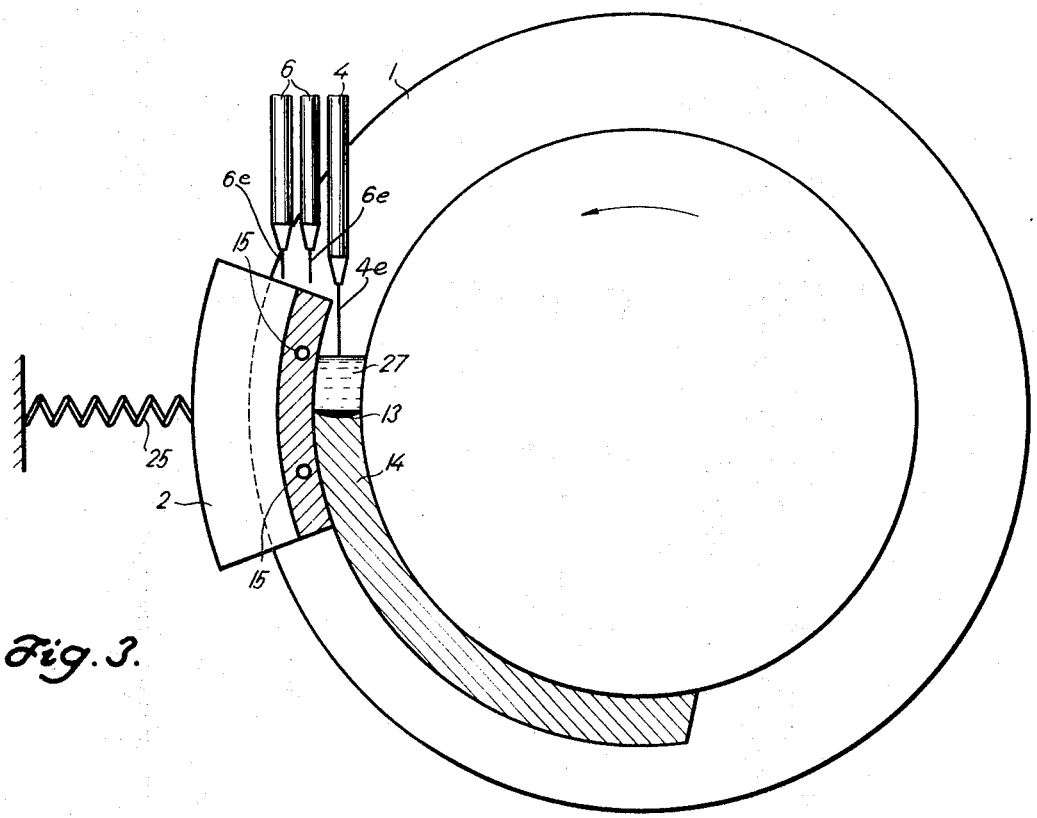
Fig. 3.
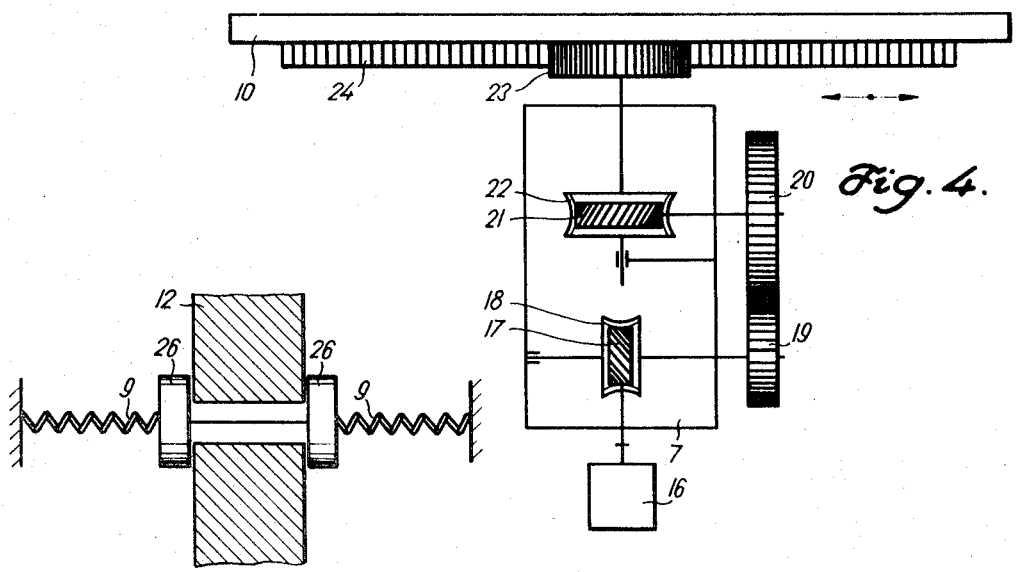
Fig. 4.
Fig. 5.
INVENTORS:
Pavel Blaskowits
BY: Jiri Borda
Arthur O. Klein
ATTORNEY

3,622,736

ARRANGEMENT FOR DEPOSITING A METALLIC LAYER USING THE ELECTROSLAG METHOD ON THE CIRCUMFERENCE OF HORIZONTAL CYLINDRICAL BODIES

BACKGROUND OF THE INVENTION

This invention relates to an arrangement for depositing a metallic layer on calibrating rolls as used for instance on rolling machines, such rolls having parts with a longitudinal section of the shape of the letter "V" or a similar shape, and on similar objects, with the rolls in a horizontal position, by using the so called electroslag-welding method.

Depositing of metallic layers by electroslag welding on cylindrical objects is already commonly known. Known methods use, for instance, for the guiding of the welding electrode of the welding machine in the welding gap a turntable or some other mechanism, by means of which the track which is covered by the welding electrode is always circular. This guiding of electrodes is suitable for the depositing of metallic layers on cylindrical or oval calibrating rolls so long as the circular movement of the electrodes does not interfere with the supply of the welding wire into the welding gap. A drawback of this method of guiding of electrodes was that it did not enable to build up metallic layers on cylindrical calibrating rolls with a longitudinal section of the shape of the latter "V" or of narrow ovals or of similarly shaped objects.

The technical problem of depositing of metallic layers on cylindrical calibrating rolls with a longitudinal section of the shape of the letter "V" or of a similar shape has been actually solved by arc welding so that the welding bead has been deposited along a spiral, generated by a combination of the movement of the nozzle of the welding machine and of the cylinder. This solution cannot, however, be applied for building up of metallic layers by electroslag welding on cylindrical calibrating rolls of said shape, as it is impossible to secure a stabilized electroslag-welding process.

This welding method has therefore been applied up to now for depositing of metallic layers on cylindrical calibrating rolls of a longitudinal section of the shape of the letter "V" or of a similar shape. When using currently applied methods of electroslag welding with a set of electrodes such as welding wires which perform an oscillating movement, longitudinal cracks in the apex part of the roll having a longitudinal cross section of the shape of the letter "V" or a similar shape have developed, which depreciated the deposited layer.

SUMMARY OF THE INVENTION

It is an object of this invention to provide an arrangement which would enable the deposition, in similar circumstances, of metallic layers by electroslag welding, eliminating to a high degree the creation of cracks on the above indicated places.

The main feature of this invention consists in that in the substantially horizontal welding gap created between the surface of the slowly rotating cylindrical body and between a stable supporting plate at least one stable welding electrode guiding means feeding a welding electrode such as a wire is situated in the apex part of the welding gap, with additional mobile welding electrode guiding means feeding welding electrodes such as wires supported at both sides of said stable electrode guiding means, with means for transmitting an oscillating motion to said mobile welding electrode guiding means in a substantially horizontal plane in the direction of said welding gap.

DESCRIPTION OF THE DRAWINGS

In the attached drawings,

FIG. 3 is a cross-sectional view of the calibrating roll.

FIG. 4 shows driving means of the welding heads, and

FIG. 5 shows a motion screw for adjustment of the angular position of the welding heads.

DESCRIPTION OF PREFERRED EMBODIMENT

Figure 1:
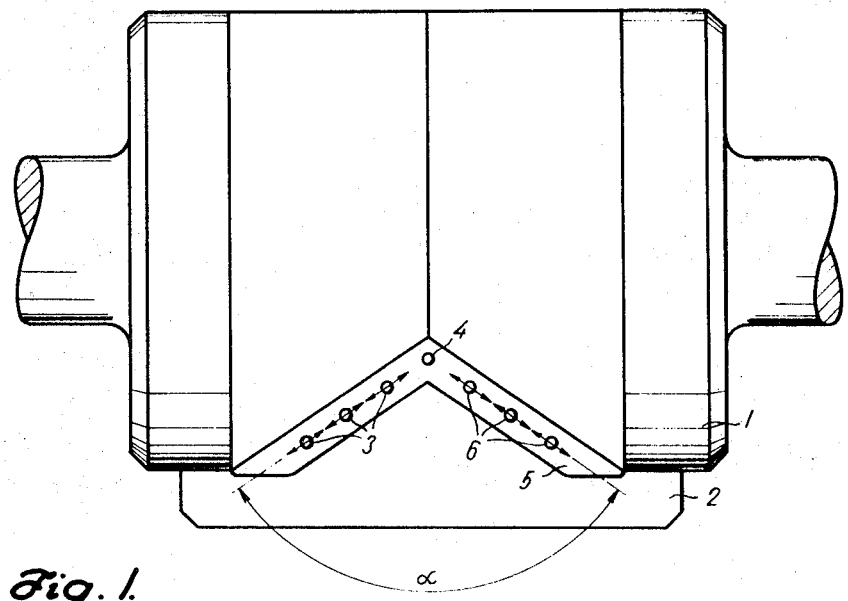
FIG. 1 is a top view of a part of a cylindrical calibrating roll with a "V" shaped longitudinal section.

A welding gap 5 of a "V" shape is formed between the surface of the cylindrical body of a calibrating roll 1 and of an additional supporting plate 2, which is generally cooled in the course of the welding process. A stable support 8 for a guiding means 4 for a stable welding electrode such as a wire 4e is provided in the apex part of the welding gap 5, sets of mobile welding electrodes 3e and 6e being held in mobile electrode guiding means 3 and 6 respectively on mobile supports 7 the respective sides of the stable welding wire 4. The mobile welding electrodes 3e and 6e perform an oscillating motion in the longitudinal direction of the welding gap 5, as indicated by arrows in FIG. 1. Both sets of welding electrodes 3e and 6e are arranged at an angle α which is practically equal to the angle of the walls of the calibrating roll 1. The relative angular position of both sets of welding electrodes 3e and 6e can be adjusted continuously according to the shape of the calibrating roll by means of a special adjusting device as will be explained in the following.

Figure 2:
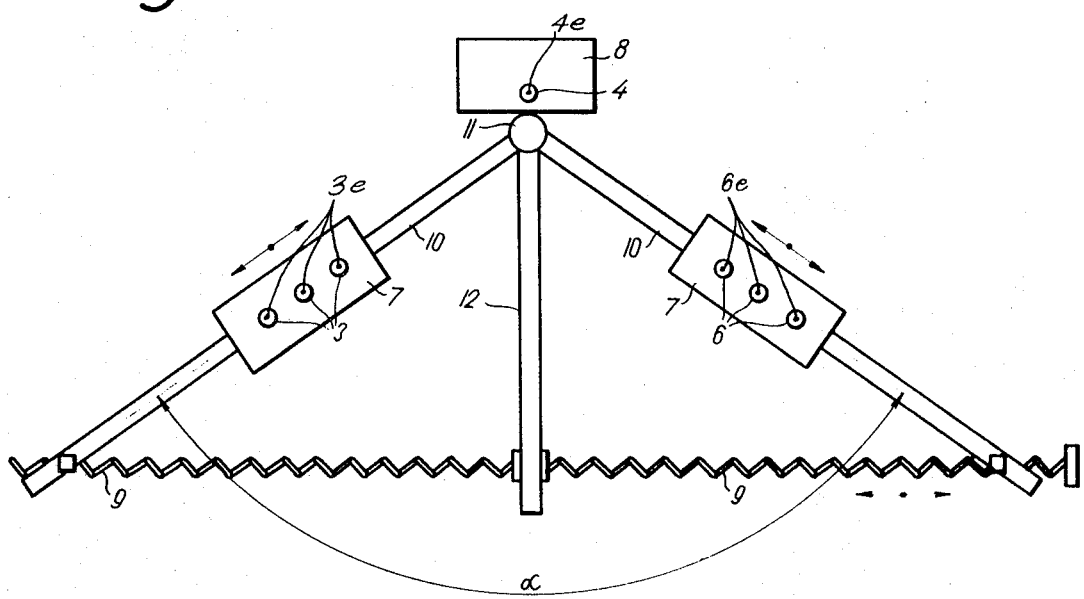
FIG. 2 is a schematic outline of an arrangement for guiding the welding wires equally in top view.

This device is indicated schematically in FIG. 2 and comprises a couple of supports 10 supporting the welding heads 7, which are slidably mounted on said supports 10. These supports 10 are joined in joints 11 and adjusted at the required angle α by a motion screw 9 with a right- and left-hand thread, which is secured against axial movement by collars 26 resting against a stable arm 12 (see FIG. 5). The guiding means 3 and 6 for the respective welding electrodes 3e and 6e which are adapted for feeding welding wires, are supported by both welding heads 7. A stable welding head 8 with one or more welding electrode guides 4 with welding wires 4e is provided at the place of the joint 11.

FIG. 3 indicates how the metallic layer is deposited on the surface of the calibrating roll 1. The supporting plate 2 is pressed against the calibrating roll 1 by a mechanism which is indicated in FIG. 3 by a pressure spring 25. The supporting plate 2 is provided with cooling channels 15 for the passage of a cooling medium, for instance, water.

The deposited metallic layer 14 is accomplished by melting of welding electrodes such as wires 3e, 4e, and 6e supplied by welding electrode guiding means 3, 4 and 6 having the shape of spouts for feeding of welding wires. The welding wires are melting in the slag pool 27 due to the supplied electric current; the molten metal collects at the bottom of the melt and creates a metallic pool 13 cooling from the bottom and protected at the top by the slag pool 27. The thickness of the deposited metallic layer is determined by the surfaces of the calibrating roll 1 and of the supporting plate 2. Due to an intensive cooling the metallic pool 13 quickly solidifies at the bottom and creates the deposited metallic layer 14. In the course of this solidifying the calibrating roll 1 is turned in the direction of the arrow indicated in FIG. 3 so that the level of the metallic pool 13 remains substantially in the same plane.

FIG. 4 shows details of an exemplary arrangement for transmitting an oscillating movement to the welding heads 7. An electric motor 16 drives by way of a worm 17 a worm wheel 18 which in turn drives interchangeable spur wheels 19 and 20. The spur wheel 20 transmits the motion to a worm 21 and to a worm wheel 22 driving a spur wheel 23 meshing with a rack 24 fixed on the support 10. By reversing the electric motor 16 a slow oscillating movement of the welding heads 7 is obtained.

The arrangement is prepared for welding on by adjusting the stable welding head 8 with the welding electrode guide 4 in the apex part of the welding gap 5 and by adjusting the angular position of both supports 10, supporting the welding heads 7 with the welding electrodes 3e and 6e by the motion screw 9 so that the angle of both supports is coincident with the angle of the respective part of the calibrating roll.

The arrangement according to this invention eliminates to a high degree any cracks of the deposited layer in parts of calibrating rolls or similar objects where adjoining walls form a sharp bend.

We claim:

1. An arrangement for depositing a metallic layer, using the electroslag method, on the circumference of cylindrical bodies in a horizontal position of their longitudinal axis, for instance, of calibrating rolls of rolling machines, having parts with a longitudinal section of the shape of the letter "V" and similar shapes, comprising in combination:

a stable supporting plate, means creating a substantially horizontal welding gap between the surface of a slowly rotating cylindrical body and said supporting plate, at least one stable welding electrode guiding means feeding a welding wire situated in the apex part of the welding gap, additional mobile welding electrode guiding means feeding welding wires supported at both sides of said stable electrode guiding means, means for transmitting an oscillating motion to said additional electrode guiding means in a substantially horizontal plane in the direction of said welding gap, and means for cooling said supporting plate.

2. An arrangement as claimed in claim 1, wherein said mobile welding electrode guiding means are provided in welding heads mounted slidingly on supports, said supports being pivotably connected to a joint and being situated in a position corresponding to the apex part of the welding gap, and comprising means for adjusting the relative angular position of both said supports.

* * * * *